(12) United States Patent
Bultje et al.

(10) Patent No.: US 9,674,530 B1
(45) Date of Patent: Jun. 6, 2017

(54) HYBRID TRANSFORMS IN VIDEO CODING

(71) Applicant: Google Inc., Mountain View, CA (US)

(72) Inventors: Ronald Sebastiaan Bultje, San Jose, CA (US); Debargha Mukherjee, Sunnyvale, CA (US); Jingning Han, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 656 days.

(21) Appl. No.: 13/874,412

(22) Filed: Apr. 30, 2013

(51) Int. Cl.
   H04N 7/30        (2006.01)
   H04N 19/61       (2014.01)
   H04N 19/176      (2014.01)

(52) U.S. Cl.
   CPC ..... *H04N 19/00793* (2013.01); *H04N 19/176* (2014.11)

(58) Field of Classification Search
   CPC ... H04N 19/176; H04N 19/147; H04N 19/159
   See application file for complete search history.

(56) References Cited

U.S. PATENT DOCUMENTS

| | | | |
|---|---|---|---|
| 4,774,574 A | 9/1988 | Daly et al. | |
| 5,068,724 A | 11/1991 | Krause et al. | |
| 5,091,782 A | 2/1992 | Krause et al. | |
| 5,121,216 A | 6/1992 | Chen et al. | |
| 5,146,324 A | 9/1992 | Miller et al. | |
| 5,224,062 A | 6/1993 | McMillan, Jr. et al. | |
| 5,235,623 A | 8/1993 | Sugiyama et al. | |
| 5,260,782 A | 11/1993 | Hui | |
| 5,274,442 A | 12/1993 | Murakami et al. | |
| 5,341,440 A | 8/1994 | Earl et al. | |
| 5,422,963 A | 6/1995 | Chen et al. | |
| 5,444,800 A | 8/1995 | Kim | |

(Continued)

FOREIGN PATENT DOCUMENTS

| | | |
|---|---|---|
| JP | 2010199959 | 9/2010 |
| WO | 99018735 A1 | 4/1999 |

(Continued)

OTHER PUBLICATIONS

B. Bross, H. Kirchoffer, H. Schwarz, T. Wiegand,"Fast intra encoding for fixed maximum depth of transform quadtree," JCTVC-C311_11, Guangzhou, CN, Oct. 2010.

(Continued)

*Primary Examiner* — Zhubing Ren
(74) *Attorney, Agent, or Firm* — Young Basile Hanlon & MacFarlane, P.C.

(57) ABSTRACT

A block of video data can be encoded using intra prediction followed by transforming the generated residual block where the transform size is different from the prediction size. A plurality of transform modes for the residual block is provided whereby the transform subblocks of the residual block are transformed using horizontal and vertical one-dimensional transform types. The transform types may be selected such that their base function corresponds to a pattern in the data of the generated residual block resulting from the intra prediction mode. As a result, the position of each block relative to the peripheral pixels used to generate a prediction block for the block may be used to select the transform types.

9 Claims, 10 Drawing Sheets

(56) References Cited

U.S. PATENT DOCUMENTS

| | | | |
|---|---|---|---|
| 5,635,938 A | 6/1997 | Komoto | |
| 5,737,020 A | 4/1998 | Hall et al. | |
| 5,764,805 A | 6/1998 | Martucci et al. | |
| 5,767,908 A | 6/1998 | Choi | |
| 5,872,866 A | 2/1999 | Strongin et al. | |
| 5,903,669 A | 5/1999 | Hirabayashi | |
| 6,108,383 A | 8/2000 | Miller et al. | |
| 6,115,501 A | 9/2000 | Chun et al. | |
| 6,134,350 A | 10/2000 | Beck | |
| 6,167,161 A | 12/2000 | Oami | |
| 6,408,025 B1 | 6/2002 | Kaup | |
| 6,522,783 B1 | 2/2003 | Zeng et al. | |
| 6,522,784 B1 | 2/2003 | Zlotnick | |
| 6,683,991 B1 | 1/2004 | Andrew et al. | |
| 6,819,793 B1 | 11/2004 | Reshetov et al. | |
| 6,917,651 B1 | 7/2005 | Yoo et al. | |
| 6,934,419 B2 | 8/2005 | Zlotnick | |
| 7,266,149 B2 | 9/2007 | Holcomb et al. | |
| 7,292,634 B2 | 11/2007 | Yamamoto et al. | |
| 7,409,099 B1 | 8/2008 | Ameres et al. | |
| 7,492,823 B2 | 2/2009 | Lee et al. | |
| 7,894,530 B2 | 2/2011 | Gordon et al. | |
| 7,912,318 B2 | 3/2011 | Nakayama | |
| 7,936,820 B2 | 5/2011 | Watanabe et al. | |
| 8,000,546 B2 | 8/2011 | Yang et al. | |
| 8,094,950 B2 | 1/2012 | Sasagawa | |
| 8,116,374 B2 | 2/2012 | Gordon et al. | |
| 8,494,290 B2 | 7/2013 | Cohen et al. | |
| 8,582,656 B2 | 11/2013 | Lin et al. | |
| 8,687,699 B1 | 4/2014 | Wen | |
| 8,885,701 B2 | 11/2014 | Saxena et al. | |
| 9,106,933 B1 | 8/2015 | Bankoski et al. | |
| 9,219,915 B1 | 12/2015 | Bultje et al. | |
| 2002/0168114 A1 | 11/2002 | Valente | |
| 2002/0196983 A1 | 12/2002 | Kobayashi | |
| 2003/0048943 A1 | 3/2003 | Ishikawa | |
| 2003/0146925 A1 | 8/2003 | Zhao et al. | |
| 2004/0057519 A1 | 3/2004 | Yamamoto et al. | |
| 2004/0125204 A1 | 7/2004 | Yamada et al. | |
| 2004/0179820 A1 | 9/2004 | Kashiwagi et al. | |
| 2004/0184537 A1 | 9/2004 | Geiger et al. | |
| 2005/0025246 A1* | 2/2005 | Holcomb | 375/240.23 |
| 2005/0053151 A1 | 3/2005 | Lin et al. | |
| 2005/0147163 A1 | 7/2005 | Li et al. | |
| 2005/0249291 A1 | 11/2005 | Gordon et al. | |
| 2006/0045368 A1 | 3/2006 | Mehrotra | |
| 2006/0098738 A1 | 5/2006 | Cosman et al. | |
| 2006/0115168 A1 | 6/2006 | Kobayashi | |
| 2006/0133682 A1 | 6/2006 | Tu et al. | |
| 2006/0210181 A1 | 9/2006 | Wu et al. | |
| 2006/0239575 A1 | 10/2006 | Abe et al. | |
| 2006/0251330 A1 | 11/2006 | Toth et al. | |
| 2007/0036223 A1 | 2/2007 | Srinivasan | |
| 2007/0078661 A1 | 4/2007 | Sriram et al. | |
| 2007/0140349 A1 | 6/2007 | Burazerovic | |
| 2007/0183500 A1 | 8/2007 | Nagaraj et al. | |
| 2007/0201554 A1 | 8/2007 | Sihn | |
| 2007/0211953 A1 | 9/2007 | Sasagawa | |
| 2007/0223583 A1 | 9/2007 | Nagai et al. | |
| 2008/0008246 A1 | 1/2008 | Mukherjee et al. | |
| 2008/0043848 A1 | 2/2008 | Kuhn | |
| 2008/0084929 A1 | 4/2008 | Li | |
| 2008/0123736 A1 | 5/2008 | Sekiguchi et al. | |
| 2008/0123947 A1 | 5/2008 | Moriya et al. | |
| 2008/0123977 A1 | 5/2008 | Moriya et al. | |
| 2008/0253463 A1 | 10/2008 | Lin et al. | |
| 2008/0310512 A1 | 12/2008 | Ye et al. | |
| 2009/0041128 A1 | 2/2009 | Howard | |
| 2009/0046941 A1 | 2/2009 | Mietens et al. | |
| 2009/0067503 A1 | 3/2009 | Jeong et al. | |
| 2009/0122864 A1 | 5/2009 | Palfner et al. | |
| 2009/0123066 A1 | 5/2009 | Moriya et al. | |
| 2009/0228290 A1 | 9/2009 | Chen et al. | |
| 2009/0274382 A1 | 11/2009 | Lin et al. | |
| 2010/0020867 A1 | 1/2010 | Wiegand et al. | |
| 2010/0086049 A1 | 4/2010 | Ye et al. | |
| 2010/0246951 A1 | 9/2010 | Chen et al. | |
| 2010/0290520 A1 | 11/2010 | Kamisli et al. | |
| 2010/0309286 A1 | 12/2010 | Chen et al. | |
| 2011/0032983 A1 | 2/2011 | Sezer | |
| 2011/0090959 A1 | 4/2011 | Wiegand et al. | |
| 2011/0182352 A1 | 7/2011 | Pace | |
| 2011/0206135 A1 | 8/2011 | Drugeon et al. | |
| 2011/0243249 A1 | 10/2011 | Lee et al. | |
| 2011/0268183 A1 | 11/2011 | Sole et al. | |
| 2011/0274162 A1 | 11/2011 | Zhou | |
| 2011/0286516 A1 | 11/2011 | Lim et al. | |
| 2011/0293009 A1 | 12/2011 | Steinberg et al. | |
| 2011/0293012 A1 | 12/2011 | Au et al. | |
| 2012/0008683 A1 | 1/2012 | Karczewicz et al. | |
| 2012/0057360 A1 | 3/2012 | Swan | |
| 2012/0057630 A1 | 3/2012 | Saxena et al. | |
| 2012/0128066 A1 | 5/2012 | Shibahara et al. | |
| 2012/0162455 A1 | 6/2012 | Kim | |
| 2012/0170649 A1* | 7/2012 | Chen | H04N 19/159 375/240.12 |
| 2012/0177116 A1 | 7/2012 | Panusopone et al. | |
| 2012/0201298 A1 | 8/2012 | Panusopone et al. | |
| 2012/0230418 A1 | 9/2012 | Sole Rojals et al. | |
| 2012/0308128 A1 | 12/2012 | Oosake | |
| 2013/0003824 A1 | 1/2013 | Guo et al. | |
| 2013/0003828 A1 | 1/2013 | Cohen et al. | |
| 2013/0003859 A1 | 1/2013 | Karczewicz et al. | |
| 2013/0034152 A1 | 2/2013 | Song | |
| 2013/0070845 A1 | 3/2013 | Lim et al. | |
| 2013/0089138 A1 | 4/2013 | Guo et al. | |
| 2013/0089145 A1 | 4/2013 | Guo et al. | |
| 2013/0114730 A1* | 5/2013 | Joshi | H04N 7/30 375/240.18 |
| 2013/0128974 A1 | 5/2013 | Chien et al. | |
| 2013/0136175 A1 | 5/2013 | Wang et al. | |
| 2013/0156328 A1 | 6/2013 | Wang et al. | |
| 2013/0176211 A1 | 7/2013 | Inada et al. | |
| 2013/0243083 A1* | 9/2013 | Sezer | 375/240.02 |
| 2013/0272422 A1 | 10/2013 | Lee et al. | |
| 2013/0336410 A1 | 12/2013 | Nguyen et al. | |
| 2014/0010295 A1 | 1/2014 | Lu et al. | |
| 2014/0086314 A1 | 3/2014 | Hebel et al. | |
| 2014/0092956 A1 | 4/2014 | Panusopone et al. | |

FOREIGN PATENT DOCUMENTS

| | | |
|---|---|---|
| WO | WO2010039015 | 4/2010 |
| WO | WO2010039288 | 4/2010 |
| WO | WO2011049399 | 4/2011 |
| WO | 2012005099 A1 | 1/2012 |
| WO | 2012166959 A1 | 12/2012 |
| WO | 2014031544 A1 | 2/2014 |
| WO | 2014075552 A1 | 5/2014 |
| WO | 2014078703 A1 | 5/2014 |

OTHER PUBLICATIONS

B. Bross, W.-J Han, J.-R. Ohm, G. J. Sullivan, T. Wiegand: "High efficiency video coding (HEVC) text specification draft 7", Document of Joint Collaborative Team on Video Coding, JCTVC-I1003-d4, Apr. 27-May 7, 2012.

Chen J et al. "Description of scalable video coding technology proposal by Qualcomm (configuration)", 11. JCT-VC Meeting; 102. MPEG Meeting; Oct. 10, 2012 Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/, No. JCTVC-K0035, Oct. 2, 2012, all pages.

Chen J. et al., "TE:Simulation results for various max. number of transform quadtree depth," MPEG Meeting, Guangzhou, Chima; No. M18236; Oct. 28, 2010.

Chen P. et al., "Video coding using extended block sizes," VCEG Meeting, San Diego, US; No. VCEG-AJ23, Oct. 15, 2008.

Guo L et al.: "Transform Selection for Inter-Layer Texture Prediction in Scalable Video Coding", 11. JCT-VC Meeting; 102; MPEG Meeting; Oct. 10, 2012-Oct. 19, 2012; Shanghai; (Joint Collabora-

(56) References Cited

OTHER PUBLICATIONS tive Team on Video Coding of ISO/IEC JTC1/WG11 and ITU-T SG.16); URL:http://wftp3.itu.int/av-arch/jctvc-Site/,, No. JCTVC-K0321, Oct. 7, 2012, all pages.

ISR and Written Opinion of the International Searching Authority, for Int'l Application No. PCT/US2012/021475; Mar. 29, 2012.

ISR and Written Opinion of the International Searching Authority, for Int'l Application No. PCT/US2012/020167; Mar. 29, 2012.

Krit Panusopone, et al. "Efficient Transform Unit Representation," Joint Collaborative Team on Video Coding (JCT-VC) of UTU-T SG16 WP3 and ISO/IEC JTC1/SC29/WG11 4nd Meeting: Daegu, KR, Jan. 22, 2011.

Lee B. et al., "Hierarchical variable block transform," JCT-VC Meeting, Geneva, Switzerland; No. JCTVC-B050; Jul. 24, 2010.

Lee T et al.: "TE12.1: Experimental results of transform unit quadtree/2-level test", 3 JCT-VC Meeting; 94. MPEG Meeting; Jul. 10, 2010-Oct. 15, 2010; Guangzhou; (Joint Collaborative Team on Video Coding of ISO/IEC JTC1/SC29/WG11 and ITU-T SG.16); URL:http://wftp3.itu.int/av-arch/jctvc-Site/,, No. JCTVC-C200, Oct. 2, 2010, all pages.

McCann K. et al.; "Video coding technology proposal by samsung (and BBC)," JCT-VC Meeting; Dresden, Germany, Apr. 15, 2010.

Krit Panusopone et al., "Flexible Picture Partitioning", JCT-VC (Joint Collaborative Team on Video Coding) JCTVC-C260, Meeting, Oct. 7-Oct. 15, 2010.

Saxena A et al.: "On secondary transforms for intra/inter prediction residual", 9. JCT-VC Meeting; 100. MPEG Meeting; Apr. 27, 2012-Jul. 5, 2012; Geneva; (Joint Collaborative Team on Video Coding of ISO/IEC JTC1/SC29/WG11 and ITU-T SG.16); URL:http://wftp3.itu.int/av-arch/jctvc-Site/,, No. JCTVC-10232, Apr. 17, 2012, all pages.

Wiegand, T; B. Bross, J. Ohm, G. Sullivan, "WD1: Working Draft 1 of High-Efficiency Video Coding," JCTVC-C403, Guangzhou, CN, Oct. 7-15, 2010.

Wiegand et al. "BoG report: residual quadtree structure" JCTVC-C319_r1, Guangzhou, CN Oct. 2010.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide: draft bankoski-vp8-bitstream 02" Network Working Group. Dated May 18, 2011.

Bankoski et al. "Technical Overview of VP8, An Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

Han et al., "Toward Jointly Optimal Spatial Prediction and Adaptive Transform in Video/Image Coding," ICASSP 2010 (Dallas, TX, Mar. 14-19, 2010).

Han et al., "Jointly Optimized Spatial Prediction and Block Transform for Video and Image Coding," IEEE Transactions on Image Processing, vol. 21, No. 4 (Apr. 2012).

Sikora, T. et al., Shape-adaptive DCT for generic coding of video, Circuits and Systems for Video Technology, IEEE Transactions on vol. 5, Issue 1, p. 59-62, Feb. 1, 1995.

Chen, Y, J. Han, T. Nanjundaswamy, and K. Rose, "A joint spatio-temporal filtering approach to efficient prediction in video compression," Picture Coding Symposium, 2013.

McCann et al., "Samsung's Response to the call for proposals on video compression technology" JCTVC of ITU-T SG16 WP3 and ISO/IEC JTC1/SC29/WG11; 1st meeting; Dresden, DE, Apr. 15-23, 2010; JCTVC124; 42 pages.

Wiegand et al, "Overview of the H 264/AVC Video Coding Standard," IEEE Transactions on Circuits and Systems for Video Technology, vol. 13, No. 7, pp. 568, 569, Jul. 1, 2003.

Xin, J., K. N. Ngan, and G. Zhu, "Combined inter-intra prediction for high definition video coding," Picture Coding Symposium, 2007.

International Preliminary Report and Written Opinion of the International Searching Authority for International Application No. PCT/US2013062216 mailed Mar. 31, 2015.

Saxena A et al.: "On secondary transforms for Intra BVL residue", 13. JCT-VC Meeting; 104. MPEG Meeting; Apr. 18, 2013-Apr. 26, 2013; IncHEON; (Joint Collaborative Team on Video Coding of ISO/IEC JTC1/SC29/WG11 and ITU-T SG.16); URL:http://wftp3.itu.int/av-arch/jctvc-Site/, No. JCTVC-M0033, Apr. 9, 2013, all pages.

Wiegand, Thomas, et al.; Long-Term Memory Motion-Compensated Prediction, date unknown.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

* cited by examiner

HYBRID TRANSFORMS IN VIDEO CODING

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques.

SUMMARY

This disclosure relates to encoding and decoding visual data, such as video stream data, for transmission or storage, and in particular relates to coding visual data using hybrid transforms. Disclosed herein are aspects of systems, methods and apparatuses for incorporating hybrid transforms into video coding, particularly where a transform block size and a prediction block size are different. One method described herein includes identifying an intra prediction mode of a current block of a frame in a video stream, the intra prediction mode being one of a plurality of intra prediction modes, predicting the current block to form a residual block using the intra prediction mode, the current block and the residual block having a prediction size, identifying a plurality of transform subblocks for the residual block, each of the plurality of transform subblocks having a transform size different from the prediction size, identifying a transform mode for the residual block using a proximity of each of the plurality of transform subblocks to peripheral pixels used in predicting the current block, the transform mode associated with a respective transform type for vertical pixels and a respective transform type for horizontal pixels of each the plurality of transform subblocks, and transforming each of the plurality of transform subblocks to include in an encoded video bitstream using the vertical transform type and the horizontal transform type.

One apparatus described herein includes a memory and a processor. In an implementation, the processor is configured to execute instructions stored in the memory to identify an intra prediction mode of a current block of a frame in a video stream, the intra prediction mode being one of a plurality of intra prediction modes, predict the current block to form a residual block using the intra prediction mode, the current block and the residual block having a prediction size, identify a plurality of transform subblocks for the residual block, each of the plurality of transform subblocks having a transform size different from the prediction size, identify a transform mode for the residual block using a proximity of each of the plurality of transform subblocks to peripheral pixels used in predicting the current block, the transform mode associated with a respective transform type for vertical pixels and a respective transform type for horizontal pixels of each the plurality of transform subblocks, and transform each of the plurality of transform subblocks to include in an encoded video bitstream using the vertical transform type and the horizontal transform type.

Another method described herein includes identifying an intra prediction mode of an encoded block in a video bitstream, the intra prediction mode being one of a plurality of intra prediction modes and the encoded block being an encoded residual block formed by predicting a current block of a frame of a video stream, predicting the current block to form a prediction block using the intra prediction mode, the current block having a prediction size, identifying a plurality of transform subblocks for the encoded residual block, each of the plurality of transform subblocks having a transform size different from the prediction size, identifying a transform mode of the encoded residual block, the transform mode based on a proximity of each of the plurality of transform subblocks to peripheral pixels used in predicting the current block and the transform mode associated with a respective transform type for vertical pixels and a respective transform type for horizontal pixels of each the plurality of transform subblocks, inverse transforming each of the plurality of transform subblocks using the vertical transform type and the horizontal transform type to form a residual block, and reconstructing the current block by adding the residual block and the prediction block.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Real-time video streaming, multi-point video conferencing or video broadcasting are examples of applications that employ video stream encoding including compression. One compression technique uses prediction to reduce the amount of data to be encoded. A block may be predicted by generating a prediction block using either inter prediction or intra prediction. Inter prediction generates the prediction block by performing a motion search to find pixel data matching the block from, e.g., another frame. Intra prediction generates the prediction block using pixel data from nearby blocks. The pixel data used to generate the prediction block is encoded. To encode the current block, only the differences (called a residual or residual block) between the current block and the prediction block need be encoded, thereby reducing the number of bits to be included in the encoded video bitstream.

Some systems may use transforms to code the residual. Transforms have a transform type and a transform size, for example. One technique for selecting the transform type for a residual generated using an intra prediction mode is to select a hybrid mode that applies a one-dimensional transform to the residual in the horizontal direction and a one-dimensional transform to the residual in the vertical direction where the transform type for each of the two directions is either the same or different depending on the intra prediction mode. The transform is applied to a transform block, which can encompass all of the pixels of the residual block in an implementation. That is, the size (i.e., the dimensions) of the transform block (also called the transform size) may be the same as the size of the residual block (also called the prediction size). The teachings herein describe techniques to select a hybrid transform mode for a block to be encoded when its prediction and transform sizes are different. This can improve coding efficiency.

First discussed below are environments in which aspects of this disclosure can be implemented, and then details of certain implementations are explained.

Figure 1:
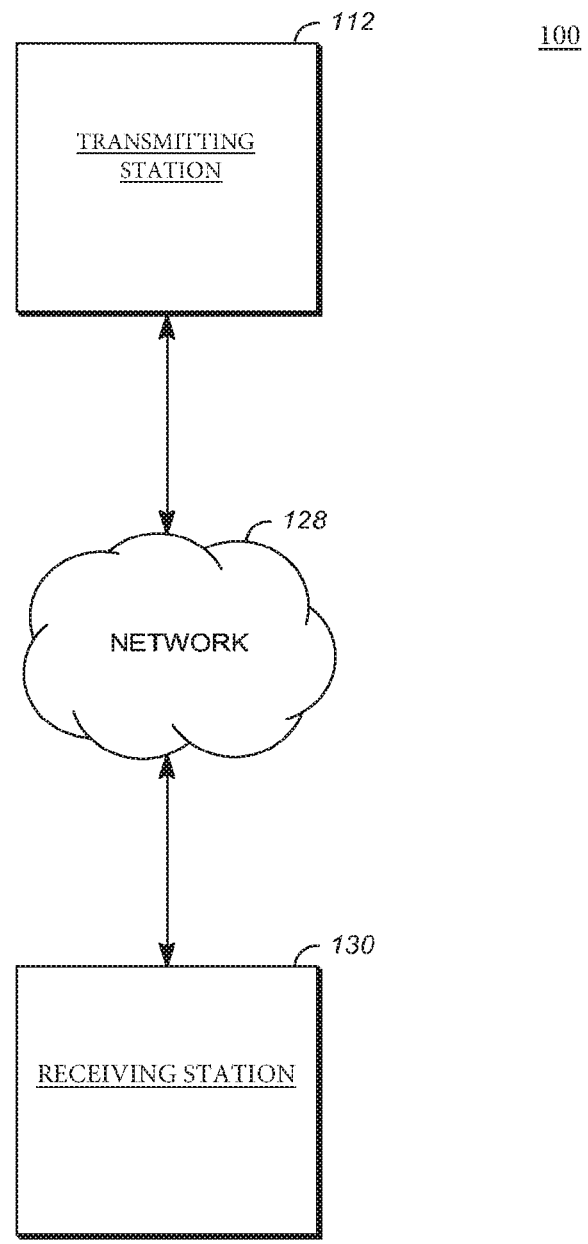
FIG. 1 is a schematic diagram of a video encoding and decoding system.

FIG. 1 is a schematic diagram of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
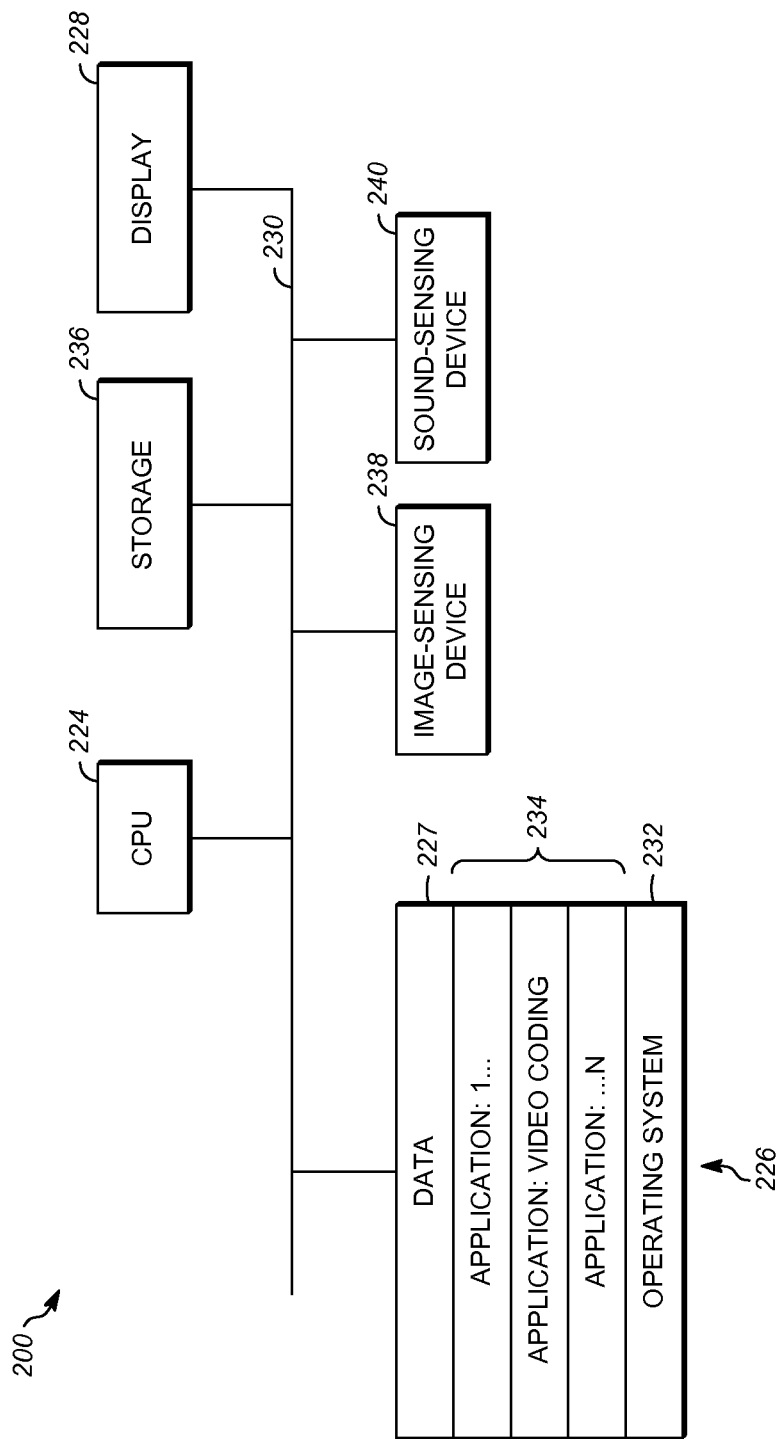
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video coding application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
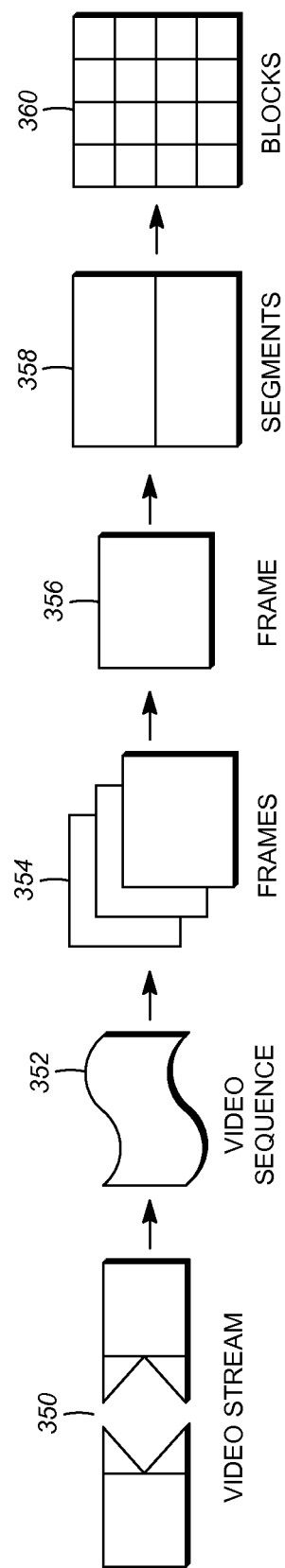
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames. Adjacent frames 354 can then be further subdivided into individual frames, e.g., a single frame 356. At the next level, a single frame 356 can be divided into a series of segments or planes 358. Segments or planes 358 can be subsets of frames that permit parallel processing, for example. Segments or planes 358 can be subsets of frames 354 that separate the video data in a frame 356 into, for example, separate colors. In one implementation, frame 356 of color video data can include a luminance plane 358 and two chrominance planes 358. Planes 358 can be sampled at different resolutions.

Segments or planes 358 include blocks 360 that contain data corresponding to, for example, 16×16 pixels in frame 356. Blocks 360 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
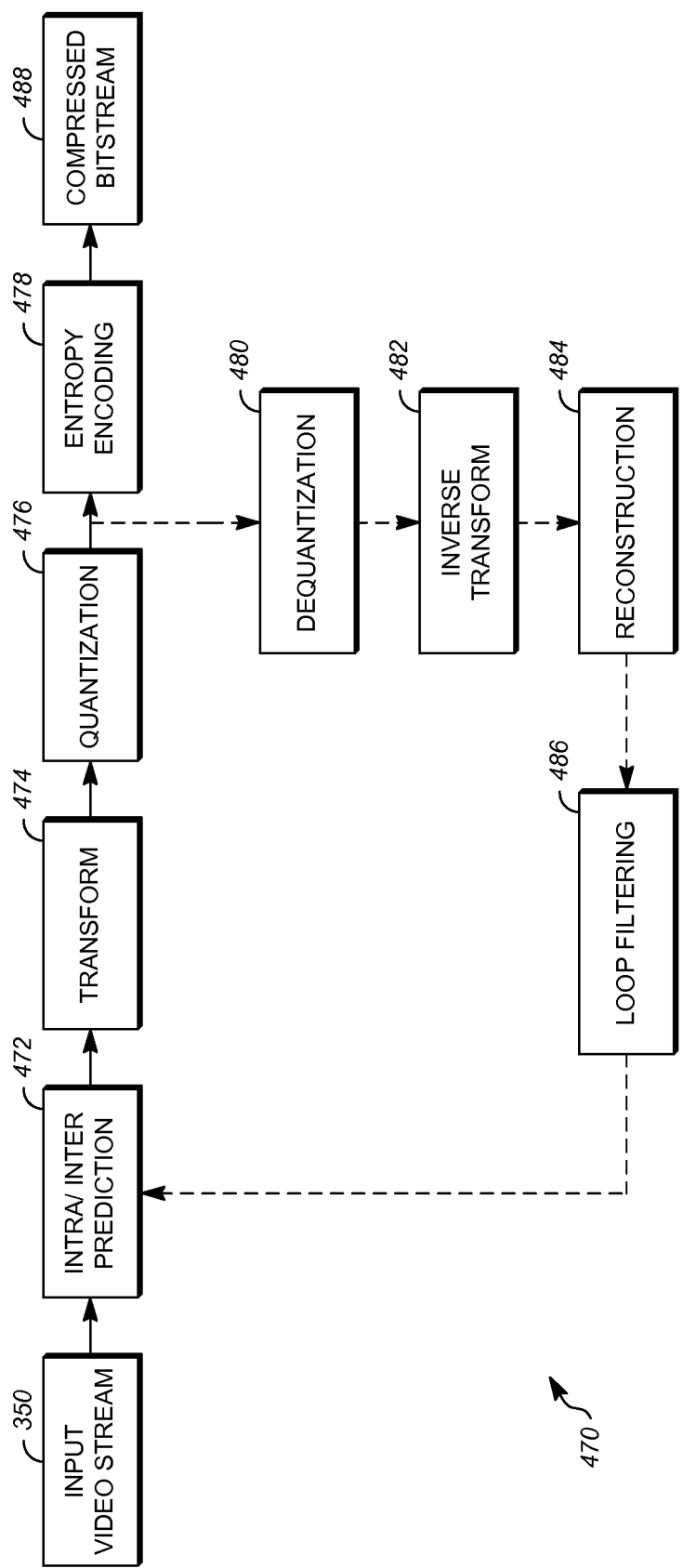
FIG. 4 is a block diagram of a video compression system according to one implementation of the teachings herein.

FIG. 4 is a block diagram of an encoder 470 in accordance with an implementation of the teachings herein. Encoder 470 can be implemented in transmitting station 112, as described above, such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 3, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 including planes 358 within video stream 350 can be processed in units of blocks 360. At the intra/inter prediction stage 472, each block 360 can be encoded using intra-frame prediction (also called intra prediction) or inter-frame prediction (also called inter prediction). In any case, a prediction block can be formed. In the case of intra prediction, a prediction block can be formed from samples in the current frame that have been previously encoded and reconstructed. In the case of inter prediction, a prediction block can be formed from samples in one or more previously constructed reference frames.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix. In certain implementations described herein, an Asymmetric Discrete Sine Transform (ADST) is used.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
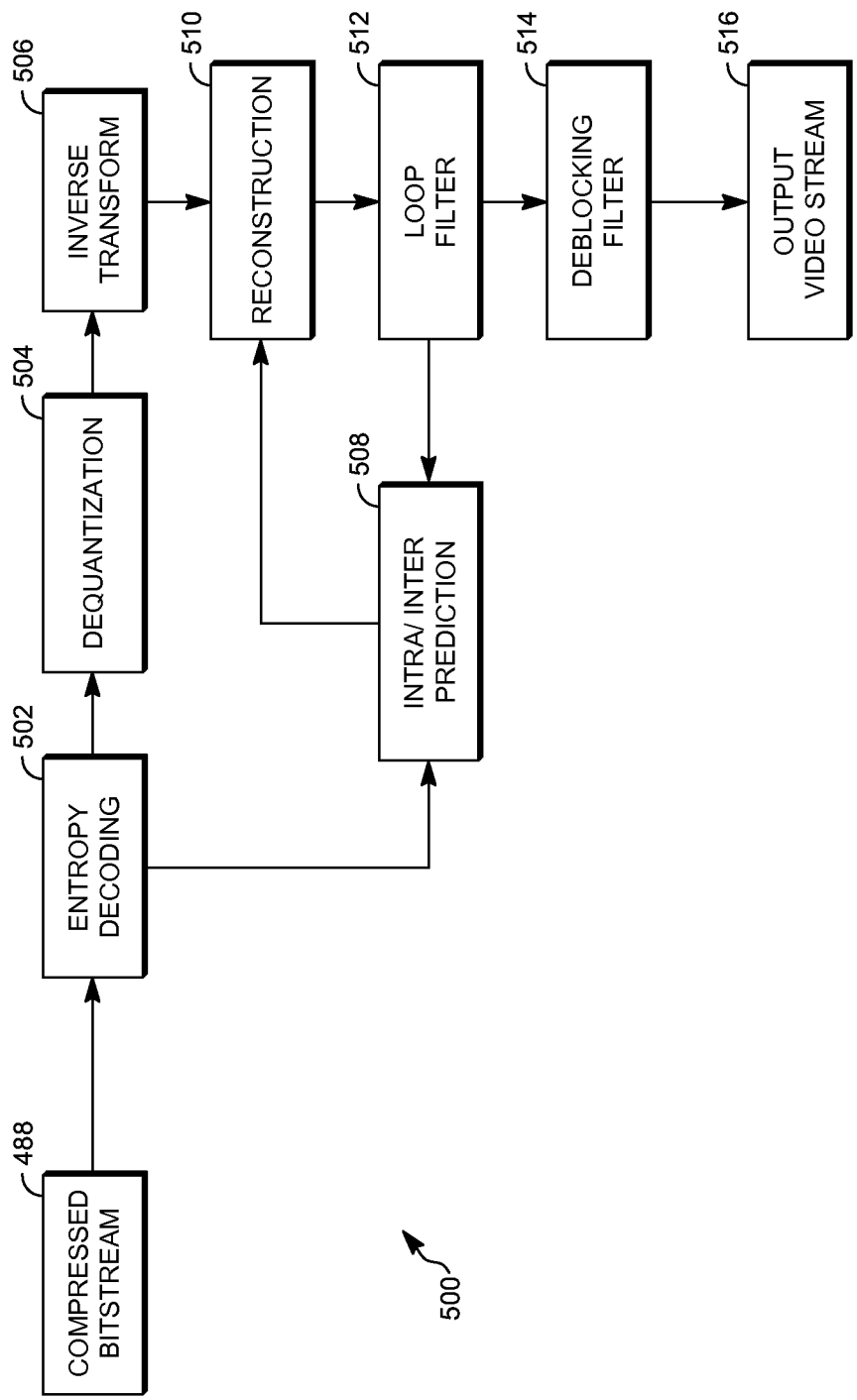
FIG. 5 is a block diagram of a video decompression according to another implementation of the teachings herein.

FIG. 5 is a block diagram of a decoder 500 in accordance with another implementation of the teachings herein. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5.

Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. For example, deblocking filtering stage 514 can be applied to the reconstructed block to reduce blocking distortion, and the result is output as output video stream 516. Output video stream 516 can also be referred to as a decoded video stream and the terms will be used interchangeably herein.

Other variations of decoder 500 can be used to decode compressed bitstream 488. For example, decoder 500 can produce output video stream 516 without deblocking filtering stage 514.

In the encoding and decoding schemes described above, a prediction block may have the same size as the block to be encoded. When applying transforms, however, smaller sizes may be used to further reduce bit count or increase accuracy. For example, a block may be formed of 8×8 pixels such that the prediction size is 8×8 pixels, but the transform size for the block may be 4×4 pixels. Thus, there would be four transform subblocks for the residual block resulting from the difference between the prediction block and the block to be encoded. As described below, the teachings herein specify the behavior of hybrid transform type selection when the transform size is different from the prediction block size. In an implementation, what transform type may be used by each of the transform blocks may be determined for different directional intra prediction modes.

Figure 6:
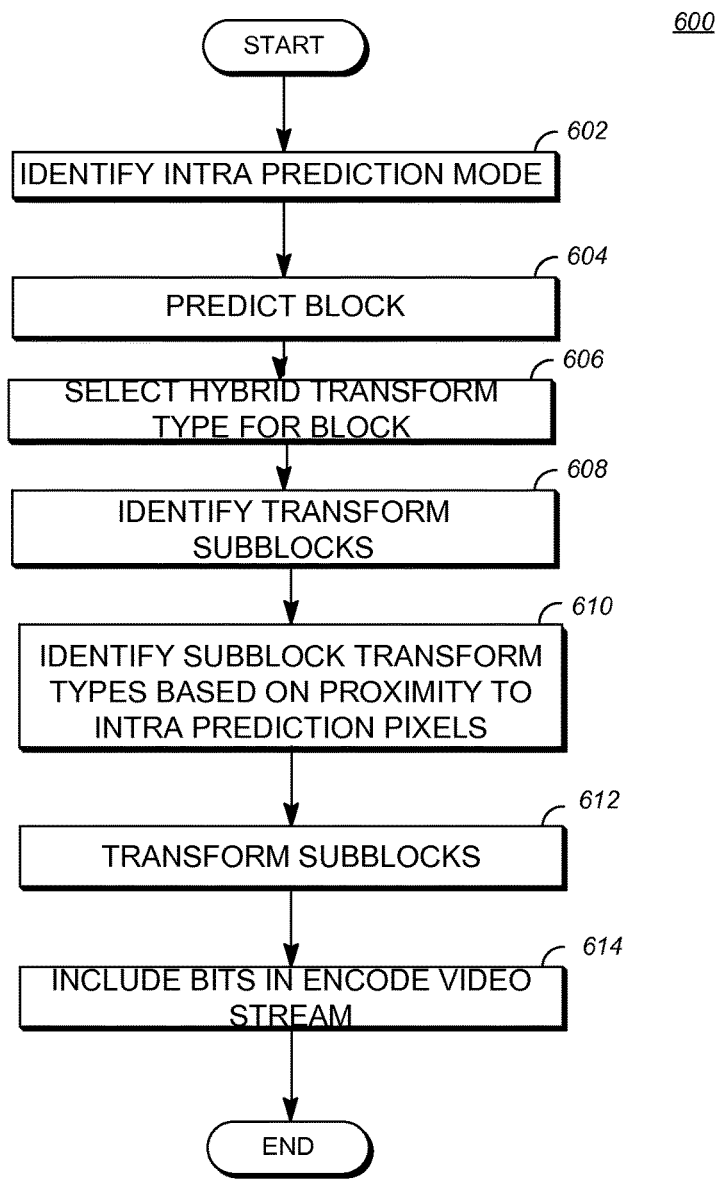
FIG. 6 is a flowchart diagram of a process for encoding a video stream in accordance with aspects of the teachings herein.

FIG. 6 is a flowchart diagram of a process 600 for encoding of a video stream in accordance with aspects of the teachings herein. Process 600 encodes blocks of a frame of video stream data and can be implemented in a system such as encoder 470 to encode a video stream using prediction and transformation where the transform block size is different from the prediction block size. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, process 600 begins by identifying an intra prediction mode to be used to predict a block. The block could correspond to, for example, block 360 of frame 356 in FIG. 3, for example. By identify, we mean distinguish, determine, select, or otherwise identify in any manner whatsoever. As discussed above in relation to FIGS. 4 and 5, intra prediction is a technique for encoding blocks of video data that relies on pixels peripheral to the block to predict the pixel values of the block.

Figure 9:
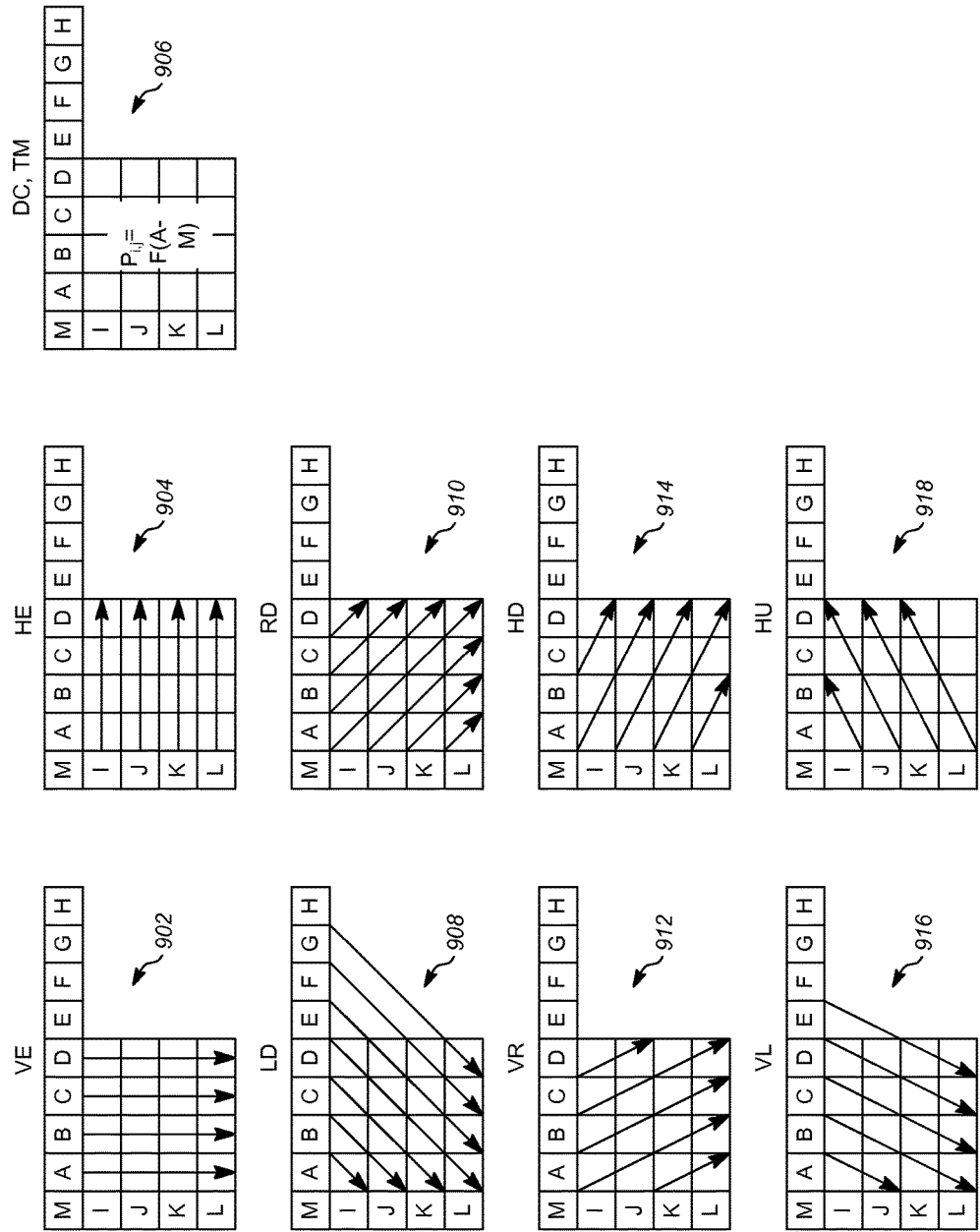
FIG. 9 is a diagram showing various intra prediction modes that may be used in implementations of the teachings herein.

FIG. 9 is a diagram showing various intra prediction modes that may be used in implementations of the teachings herein. Ten different intra prediction modes are shown by example. Intra prediction forms a prediction block by setting the pixels of a block, 4×4 pixels in FIG. 9, to values based on the values of peripheral pixels A-M. Intra prediction may set a pixel value of the prediction block to one of the peripheral pixel values or may combine values for more than one peripheral pixel to form the values of the prediction block.

In FIG. 9, diagram 902 illustrates vertical mode VE, which propagates peripheral pixels A through D down the columns of the prediction block such that each pixel in a column has its value set equal to that of the adjacent peripheral pixel A through D in the direction of the arrows. More generally, the value may not be exactly equal, but may instead be related by some function. Diagram 904 illustrates horizontal mode HE, which similarly propagates the values of peripheral pixels I through L along horizontal rows of the block in the direction of the arrows. Diagram 906 includes two different modes, DC and TrueMotion (TM) mode. In each of these modes, the pixels of the block are set equal to a function of the peripheral pixels, for example an average of pixels A through D and I through J for DC mode or the peripheral pixel above the pixel of the block (one of A through D) plus the peripheral pixel in the same row as the pixel (one or I through L) minus peripheral pixel M for TM mode.

Diagram 908 illustrates diagonal down/left mode LD, which forms a prediction block as a weighted average of two or three peripheral pixel values (from pixels A through H) and propagates the weighted averages into the 4×4 pixel prediction block in the direction of the arrows. Diagram 910 illustrates diagonal down/right mode RD, which includes forming weighted averages of two or three pixel values from peripheral pixels A through D and I through M and propagates the weighted averages in the direction of the arrows. Diagram 912 illustrates vertical/right mode VR, which includes forming weighted averages of two or three pixel values from peripheral pixels I through M and propagates them into the 4×4 prediction block along the arrows. Diagram 914 illustrates horizontal/down mode HD, which includes forming weighted averages of two or three pixel values from the peripheral pixels A through D and I through M and propagates the weighted pixel values to form the prediction block. Diagram 916 illustrates mode vertical/left VL, which includes forming weighted averages of values of pixels A through H and propagating the weighted averages into the 4×4 prediction block according to the arrows. Diagram 918 illustrates horizontal/up mode HU, which includes forming weighted averages of values of pixels I through M and propagates the weighted averages into the 4×4 prediction block according to the arrows.

The exact technique of combining the pixel values in each mode may vary between video encoding systems of different entities, and more, fewer or different modes may be available. Accordingly, the modes of FIG. 9 are shown only for illustrative purposes. For example, the intra prediction modes shown in FIG. 9 are directed generally to encoders that use raster scan order for the processing of blocks in a frame. Different modes may be desirable when another scan order, such as a spiral scan, etc., is used.

Returning to FIG. 6, process 600 may identify an intra prediction mode at step 604 to use to predict a block by testing some or all of the available modes and selecting the intra prediction mode that provides the best compression ratio (fewest bits, including bits required to specify the intra prediction mode in the encoded video bitstream) with the least distortion (that is, the least amount of error in the predicted and subsequently reconstructed block). This selection process may occur in a rate distortion loop. Note that, in this case, it is assumed that the best prediction mode for the block is an intra prediction mode. However, blocks may be better predicted by inter prediction. In such a case, the transform mode, if any, for the residual block of the inter predicted block may be selected by means other than those described herein.

At step 604, process 600 predicts the block by, e.g., forming a prediction block using the selected intra prediction mode and subtracting the prediction block from the block to be predicted/encoded on a pixel-by-pixel basis to form a residual block. The residual block can then be further encoded using transforms. The first step in this process is to select the hybrid transform type for the block as a whole based on the intra prediction mode at step 606. FIG. 9 and Table 1, below, may be used to describe step 606.

More specifically, when selecting a transform for a residual block, 4×4, 8×8 or 16×16 transforms have been used. For example, transforming a block of residual pixel data of 16×16 can involve performing a 2D transform (e.g., a 16×16 transform or four 8×8 transforms) on the (two-dimensional) 2D array of data values. Alternatively, 2D transforms that rely on a separable kernel can be separated into a series of one-dimensional (1D) transforms. In this type of kernel decomposition, the 2D transform can be accomplished by performing a series of 1D transforms on the rows and columns of the block. For example, the 2D array of residual pixels can be transformed by first applying one-dimensional (1D) transforms to the columns (vertically-arranged pixels) of a block followed by applying 1D transforms to the rows (horizontally-arranged pixels) or vice-versa.

Separating the 2D transform into a series of 1D transforms permits the use of different kernels for the rows and columns of the block. This separation can be used to receive further efficiencies by recognizing that the variance of the residual, in general, will be lowest at the prediction edge (e.g., the vertical edge formed of pixels A-H or the horizontal edge formed of pixels I-L referring to FIG. 9) and will be highest at the opposite side of the prediction edge. Accordingly, 1D transforms may be selected whose base functions match the pattern of the residual. In the examples provided herein, combinations of a 1D Discrete Cosine Transform (DCT) and a 1D Asymmetric Discrete Sine Transform (ADST) may be used. For the intra prediction modes of FIG. 9, the combinations are as follows.

TABLE 1

| Transform mode | Intra Prediction mode | First transform type/direction | Second transform type/direction |
| --- | --- | --- | --- |
| 1 | TM | ADST/vertical | ADST/horizontal |
| 2 | RD | ADST/vertical | ADST/horizontal |
| 3 | VE | ADST/vertical | DCT/horizontal |
| 4 | VR | ADST/vertical | DCT/horizontal |
| 5 | HE | DCT/vertical | ADST/horizontal |
| 6 | HD | DCT/vertical | ADST/horizontal |
| 7 | HU | DCT/vertical | ADST/horizontal |
| 8 | DC | DCT/vertical | DCT/horizontal |
| 9 | LD | DCT/vertical | DCT/horizontal |
| 10 | VL | DCT/vertical | DCT/horizontal |

The transforms for modes in Table 1 are selected to maximize the compression efficiency for the pattern of the residual components for the entire block based on the underlying functions of DCT and ADST. That is, using different kernels for the rows and columns of a block permits the transform to be adapted to take advantage of known characteristics of intra predicted residuals. For example, DCT can achieve good compression with low distortion for pixel data where the accuracy of the prediction is evenly distributed over a row or column of pixel data. In contrast, ADST can achieve good compression when it is known that the pixel data is more accurate near an edge of a block, since ADST emphasizes pixel data near an edge and de-emphasizes data away from the edge. Since intra prediction can use data from pixels peripheral to the block, ADST can be advantageously used to transform intra predicted pixel data when the row or column pixel data to be transformed is near the peripheral pixels used to predict the row or column of pixel data.

Table 1 may be summarized by noting that for horizontal and horizontal-like intra prediction modes that rely primarily on values in the left-hand column of pixels (e.g., the values of pixels I-L), ADST is used in the horizontal direction and DCT in the vertical direction. Similarly, for vertical or vertical-like intra prediction modes that rely primarily on values in the top row of pixels (e.g., the values of pixels A-H), ADST is used in the vertical direction and DCT in the horizontal direction. For generally diagonal modes that rely on both top row and left-hand column values in a substantially similar manner, ADST is used in both the horizontal and vertical directions. Due to the calculations of other modes, here modes 8-10, there is no particular benefit to be gained from using ADST in either direction—that is, there is no particular pattern to the residual that would benefit from using the form of the ADST. Accordingly, DCT is used in both the horizontal and vertical directions.

Figure 8:
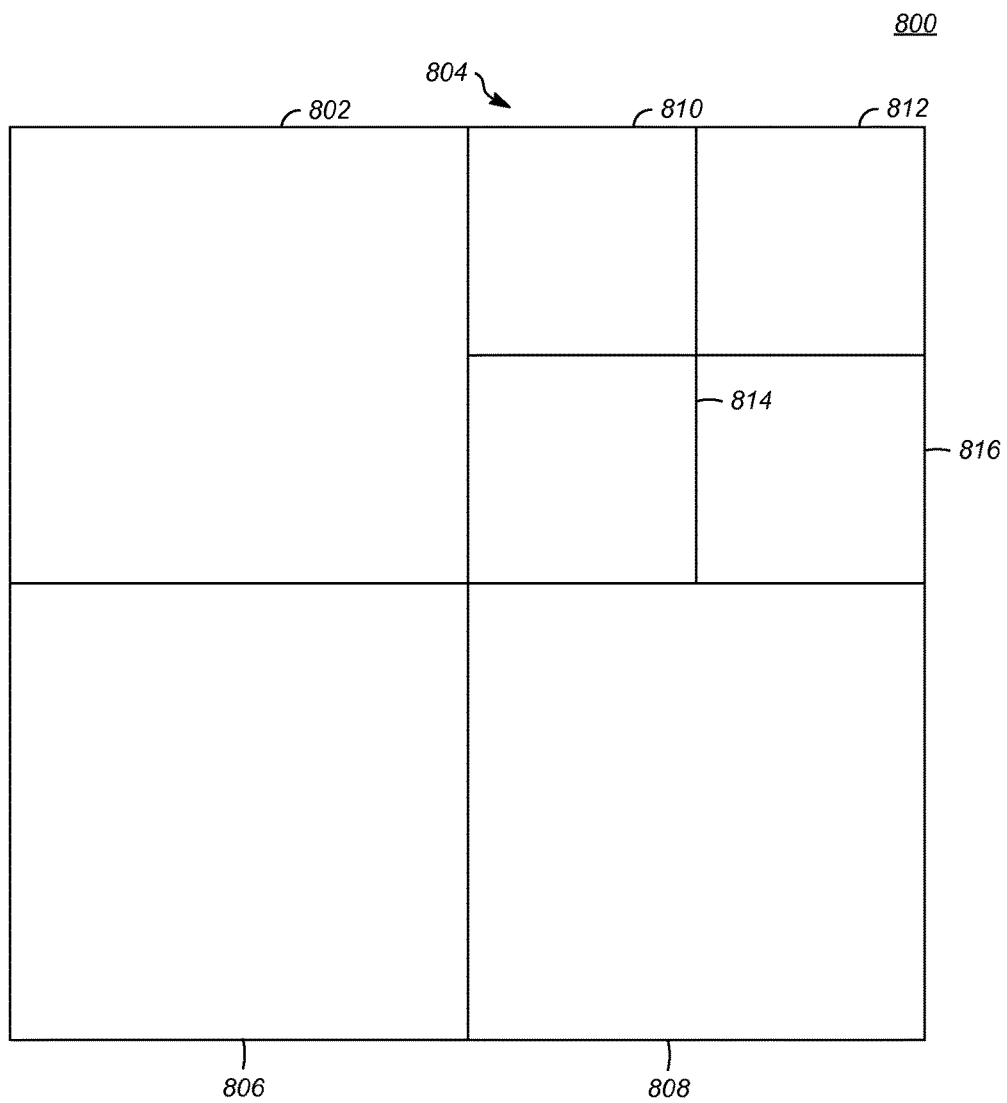
FIG. 8 is a diagram showing residual blocks and transform subblocks used to explain the process of FIG. 6.

When the transform size matches the prediction size, Table 1 is a good tool to select a transform mode. However, selecting transform types for a residual when the transform size is different (e.g., smaller) than the prediction size is more complicated. For example, intra prediction may be performed on a 16×16 block, while the resulting residual block is transformed using four 4×4 transform subblocks. FIG. 8 is a diagram showing residual blocks and transform subblocks used to explain the process of FIG. 6. A frame 800 is divided into four blocks of the same size for performing intra prediction, resulting in residual blocks 802, 804, 806, 808. One residual block 804 is shown divided into four transformation subblocks 810, 812, 814, 816. The same combination of transform types useful for transforming the whole block may not result in the best compression when applied to all four transform subblocks.

Referring again to FIG. 6, step 608 of process 600 identifies transform subblocks of the current block. The size (and thus the number and location) of transform subblocks may be selected in a variety of ways. Depending on the input, one transform size or mode may more efficiently encode residual information than another. For example, when the video source has a high spatial coherence (e.g., high-definition (HD) material), a 16×16 DCT might be highly efficient. On the other hand, for very complicated blocks, a 4×4 transform can be more efficient. One technique to select transform sizes indicates a default transform size and/or mode in a frame header and then estimates the distortion of transform modes other than the default transform mode. If an estimated transform mode incurs less distortion than the default transform mode, the default transform mode can be updated following encoding the frame for use by subsequent frames. In this fashion, the default transformation mode can converge to an optimal state after encoding a small number of frames. The default transformation mode can be used to identify the transform subblocks at step 608 in this example.

Similar to the reasoning above with respect to the whole residual block, it is likely that residuals closer to a prediction edge are smaller than those more distant from the prediction edge. In consideration of this, process 600 identifies the subblock transform types for each subblock based on that subblock's proximity to pixels used to generate the prediction block, also called the intra prediction pixels, at step 610. In this example, step 610 is a multi-step process that starts with setting the top-left or upper-left transform subblock (e.g., subblock 810 in FIG. 8) to the hybrid transform selected at step 606 since that subblock is directly neighboring edges from which the prediction blocks are formed in both directions. Thus, we can assume that the residual pattern is similar to that of the complete block. In the example intra prediction modes of Table 1, this results in an upper-left transform subblock with transform types DCT (vertical)/DCT (horizontal) for a residual block generated using intra prediction mode DC, LD or VL, transform types DCT (vertical)/ADST (horizontal) for a residual block generated using intra prediction mode HE, HD or HU, transform types ADST (vertical)/ADST (horizontal) for a residual block generated using intra prediction mode TM or RD, and transform types ADST (vertical)/DCT (horizontal) for a residual block generated using intra prediction mode VE or VR. For convenience herein, these groupings of intra prediction modes may be referred to as other prediction modes, horizontal prediction modes, diagonal prediction modes and vertical prediction modes, respectively.

Transform types for the remaining subblocks are also selected based on their position in the residual block (which was also their position in the original block and the prediction block) and their relationship to the prediction pixels. For example, the remaining blocks may be grouped into those transform subblocks in the upper row of subblocks adjacent to the upper-left subblock (for example, transform subblock 812 of FIG. 8), those transform subblocks in the left-hand column adjacent to the upper-left subblock (for example, transform subblock 814 in FIG. 8), and those transform subblocks (for example, transform subblock 816 in FIG. 8) that are not upper-left, upper row or left-hand column (also called remainder subblocks). In the example of FIG. 8, one transform subblock belongs to each group, but more than one transform subblock may belong to each of these groups.

For all transform subblocks in the upper row (other than the top-left transform subblock), the same hybrid mode as the upper-left transform subblock may be used. Alternatively, the vertical transform type of the upper-left block may be combined with DCT as the horizontal transform type for these blocks. When the upper-left transform subblock is assigned the DCT/DCT hybrid transform mode, for example, the top row transform subblocks would all have transform types DCT (vertical)/DCT (horizontal).

In a like manner, the same hybrid mode as the upper-left transform subblock may be used for all transform subblocks in the left column (other than the upper-left transform subblock). Alternatively, the horizontal transform type of the upper-left block may be combined with DCT as the vertical transform type for these blocks. For the remainder subblocks, the same hybrid mode as the upper-left transform subblock may be used or the DCT/DCT hybrid transform mode may be used.

Using these choices, four transform modes may be identified for a residual block based on how ADST is applied to the subblocks since ADST is sensitive to the intra prediction mode. For example, the first transform mode uses ADST in at least one direction on all transform subblocks, the second transform mode uses ADST in at least one direction for a full edge comprising the upper-left, upper row and left-hand column transform subblocks, the third transform mode uses ADST only on subblocks proximal to the peripheral pixels used in the intra prediction mode generating the block (e.g., the upper-left and upper row transform subblocks or the upper-left and left-column transform subblocks), the fourth transform mode includes using no ADST in the transformation of any transform subblock. The actual transform mode for a block, when a choice is available based on the hybrid transform mode, may be selected in a rate distortion loop in one implementation.

At step 612, the subblocks are transformed according to the transform mode, the position of the subblock and the intra prediction mode for the block. For example, Table 2 below shows the transforms performed on different groups of subblocks based on the intra prediction mode when the first mode is selected for the block.

TABLE 2

| Intra prediction mode | Upper-left subblocks | Upper row subblocks | Left-hand column subblocks | Remainder subblocks |
|---|---|---|---|---|
| Vertical (VE, VR) | ADST/DCT | ADST/DCT | ADST/DCT | ADST/DCT |
| Horizontal (HE, HD, HU) | DCT/ADST | DCT/ADST | DCT/ADST | DCT/ADST |
| Diagonal (TM, RD) | ADST/ADST | ADST/ADST | ADST/ADST | ADST/ADST |

Table 3 below shows the transforms performed on different groups of subblocks based on the intra prediction mode when the second mode is selected for the block.

TABLE 3

| Intra prediction mode | Upper-left subblocks | Upper row subblocks | Left-hand column subblocks | Remainder subblocks |
|---|---|---|---|---|
| Vertical (VE, VR) | ADST/DCT | ADST/DCT | ADST/DCT | DCT/DCT |
| Horizontal (HE, HD, HU) | DCT/ADST | DCT/ADST | DCT/ADST | DCT/DCT |
| Diagonal (TM, RD) | ADST/ADST | ADST/ADST | ADST/ADST | DCT/DCT |

Table 4 shows the transforms performed on different groups of subblocks based on the intra prediction mode when the third mode is selected for the block.

TABLE 4

| Intra prediction mode | Upper-left subblocks | Upper row subblocks | Left-hand column subblocks | Remainder subblocks |
|---|---|---|---|---|
| Vertical (VE, VR) | ADST/DCT | ADST/DCT | DCT/DCT | DCT/DCT |
| Horizontal (HE, HD, HU) | DCT/ADST | DCT/DCT | DCT/ADST | DCT/DCT |
| Diagonal (TM, RD) | ADST/ADST | ADST/DCT | DCT/ADST | DCT/DCT |

The fourth transform mode is available for other prediction modes, that is, those prediction modes with a hybrid transform DCT (vertical)/DCT (horizontal). Subblocks are transformed using DCT/DCT in the fourth transform mode.

As discussed above, transformation of a subblock using a separable 2D transform includes transforming the rows of a block using a first 1D transform and then transforming the columns of the results of the first transforms using a second 1D transform. This is illustrated by FIG. 10.

Figure 10:
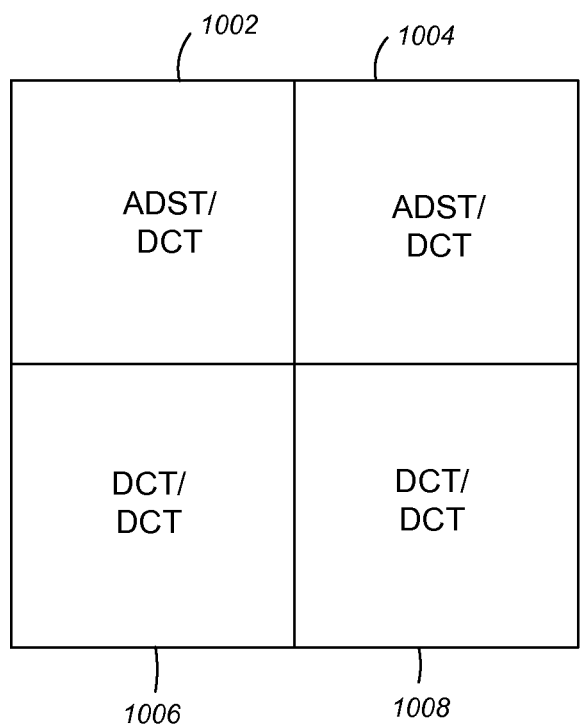
FIG. 10 is a diagram of a block showing transform types for transform subblocks based on a transform mode selected in accordance with the teachings herein.

FIG. 10 is a diagram of a block 1000 showing transform types for transform subblocks 1002, 1004, 1006, 1008 based on a transform mode selected in accordance with the teachings herein. Specifically, the transform types of FIG. 10 are associated with a vertical intra prediction mode when the third transform mode is selected as shown in Table 4 above. The transform types are identified as vertical 1D transform/horizontal 1D transform. Thus, ADST/DCT refers to performing a 1D ADST on the vertical columns of the data of transform subblock 1002, followed by transforming the transformed column data row-wise using a 1D DCT. Similarly, DCT/DCT refers to performing a 1D DCT on the vertical columns of the data of transform subblock 1006, followed by transforming the transformed column data row-wise using a 1D DCT. Similar processing is performed on transform subblocks 1004 and 1008, respectively.

Referring again to FIG. 6, after transforming the subblocks in step 612, the result block data may be further processed by the encoder as indicated above with regard to FIG. 4 and added into the bitstream at step 614, along with bits indicating the prediction mode and prediction block size, transform block size and transform modes. This latter information may be included in a frame, slice or block header, for example, and directs a decoder on how to properly decode the encoded blocks. Which group of transforms to use on the identified transform subblocks can be determined and included in the video bitstream for an entire video stream or be included in each frame header to determine the transform group to use on a frame-by-frame basis, for example.

Figure 7:
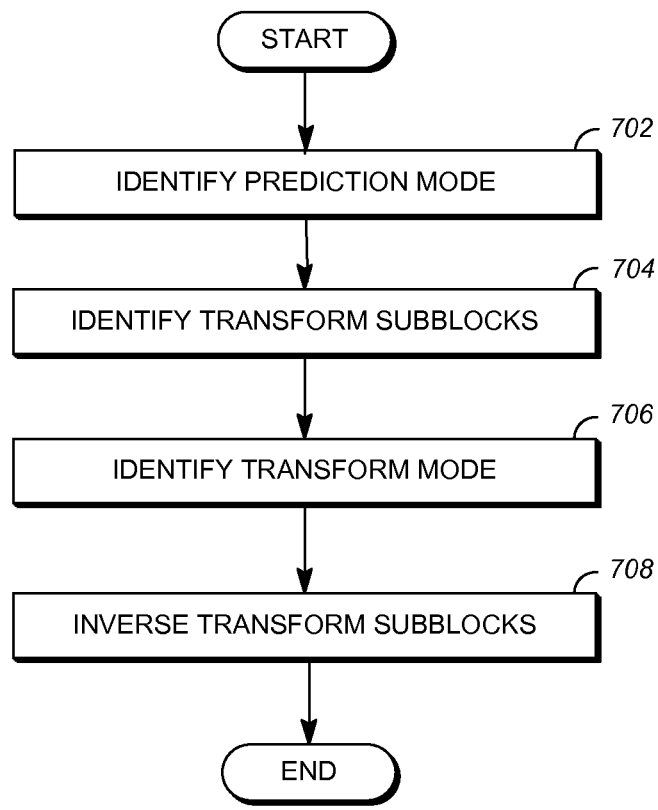
FIG. 7 is a flowchart diagram of a process for decoding a video bitstream in accordance with aspects of the teachings herein.

FIG. 7 is a flowchart diagram of a process 700 for decoding of a video bitstream in accordance with aspects of the teachings herein. Process 700 decodes blocks of a frame of video stream data and can be implemented in a system such as decoder 500 to decode a video bitstream using intra prediction and variably sized subblocks. Process 700 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 700. Process 700 can also be implemented using hardware in whole or in part. As explained above, some computing devices may have multiple memories and multiple processors, and the steps of process 700 may in such cases be distributed using different processors and memories.

For simplicity of explanation, process 700 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 702, process 700 identifies an intra prediction mode used to predict an encoded block from the received encoded video bitstream. The prediction mode may be identified by reading bits from the encoded bitstream that indicate which intra prediction mode was used to predict the block. The bits may be located on in a frame, segment and/or block header.

At step 704, the transform subblocks of the block are identified by reading bits from the encoded video bitstream. Then, at step 706, the transform mode associated with the block is identified. The bits indicating the transform mode may be an index referring to a separate definition of the modes (e.g., how to apply transform mode 1, 2, 3 or 4). In this case, it may also be desirable to transmit the hybrid mode for the block that would have resulted if the transform size matched the prediction size. Alternatively, this information could be determined by the decoder itself to use in applying the indicated transform mode. In another implementation, transform types may be specified instead of the transform mode for transform blocks or groups of transform blocks, but this may increase bit count to an undesirable level.

At step 708, the transform types associated with the transform mode identified at step 706 are used to inverse transform the transform subblocks identified at step 704. Following inverse transformation, the subblocks can be combined to form a residual block that can be predicted using the identified intra prediction mode and subsequently decoded for viewing or further processing.

According to the teachings herein, coding efficiency of residuals generated using intra prediction is improved by selecting a transform mode for a block where its residual block is divided into smaller transform subblocks. The transform mode specifies the transform type(s) for each transform subblock based on the subblock's position within the residual block and hence its relationship to a prediction edge. At least one of the transform types has a base function that matches a variance of pixels in the residual block resulting from the intra prediction mode used to generate the prediction block—that is, in general the variance will be lowest at the prediction edge (or edges) and will be highest at the opposite side of the prediction edge(s). In the examples herein, this transform type is ADST, but other transform types that provide a similar function (e.g., matching the residual pattern) may be used. Another of the transform type provides a base function that treats pixel values relatively uniformly (e.g. has a, independently of the intra prediction mode). In the examples herein, this transform type is DCT, but other transform types may be used.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
   identifying an intra prediction mode of a current block of a frame in a video stream, the intra prediction mode being one of a plurality of intra prediction modes;
   predicting, with a processor, the current block to form a residual block using the intra prediction mode, the current block and the residual block having a prediction size;
   identifying a plurality of transform subblocks for the residual block, each of the plurality of transform subblocks having a transform size smaller than the prediction size;
   identifying a transform mode for the residual block from a plurality of transform modes based on the intra prediction mode of the current block, each transform mode of the plurality of transform modes associated with a different combination of a one-dimensional transform type for columns of the residual block and a one-dimensional transform type for rows of the residual block, wherein the one-dimensional transform type for columns of the residual block comprises one of a first one-dimensional transform type having a base function that conforms with a pattern of a variance of pixel values resulting from the intra prediction mode, wherein the first one-dimensional transform type is a one-dimensional Asymmetrical Discrete Sine Transform, or a second one-dimensional transform type having a base function that treats pixel values relatively uniformly, and the one-dimensional transform type for rows of the residual block comprises one of the first one-dimensional transform type or the second one-dimensional transform type;
   identifying each of the transform subblocks as an upper-left transform subblock, an upper row transform subblock, a left-hand column transform subblock or a remainder transform subblock based on a position of the transform subblock within the residual block;

for each transform subblock of the plurality of transform subblocks, identifying a one-dimensional subblock transform type for columns of the transform subblock and a one-dimensional subblock transform type for rows of the transform subblock based on the intra prediction mode of the current block, the transform mode for the residual block, and whether the transform subblock is the upper-left transform subblock, the upper row transform subblock, the left-hand transform subblock or the remainder transform subblock, wherein the one-dimensional Asymmetrical Discrete Sine Transform is at least one of the one-dimensional subblock transform type for columns or the one-dimensional subblock transform type for rows of each of the upper-left, upper row and left-hand column subblocks; and transforming each transform subblock of the plurality of transform subblocks to include in an encoded video bitstream using the one-dimensional subblock transform type identified for the columns of the transform subblock and the one-dimensional subblock transform type identified for the rows of the transform subblock.

2. The method of claim 1 wherein identifying the transform mode comprises:

identifying a hybrid transform mode for a transform having a same size as the residual block based on the intra prediction mode, the hybrid transform mode having a first, vertical transform for the columns of the residual block and a second, horizontal transform for the rows of the residual block.

3. The method of claim 1 wherein the intra prediction mode comprises a vertical prediction mode and wherein one of:

the one-dimensional transform type for columns of each of the plurality of transform subblocks comprises the first one-dimensional transform type and the one-dimensional transform type for rows of each of the plurality of transform subblocks comprises the second one-dimensional transform type;

the one-dimensional transform type for columns of each of the upper-left subblock, any other upper row subblocks other than the upper-left subblock and any other left-hand column subblocks other than the upper-left subblock comprises the first one-dimensional transform type and the one-dimensional transform type for rows of each of the upper-left subblock, any other upper row subblocks and any left-hand column subblocks comprises the second one-dimensional transform type, and the one-dimensional transform type for columns of any subblocks of the plurality of subblocks other than the upper-left subblock, any other upper row subblocks and any other left-hand column subblocks comprises the second one-dimensional transform type and the one-dimensional transform type for rows of any subblocks of the plurality of subblocks other than the upper-left subblock, any other upper row subblocks and any other left-hand column subblocks comprises the second one-dimensional transform type; or the one-dimensional transform type for columns of each of the upper-left subblock and any other upper row subblocks other than the upper-left subblock comprises the first one-dimensional transform type and the one-dimensional transform type for rows of each of the upper-left subblock and any other upper row subblocks comprises the second one-dimensional transform type, and the one-dimensional transform type for columns of any subblocks of the plurality of subblocks other than the upper-left subblock and any other upper row subblocks comprises the second one-dimensional transform type and the one-dimensional transform type for rows of any subblocks of the plurality of subblocks other than the upper-left subblock and any other upper row subblocks comprises the second one-dimensional transform type.

4. The method of claim 1 wherein the intra prediction mode comprises a horizontal prediction mode and wherein one of:

the one-dimensional transform type for columns of each of the plurality of transform subblocks comprises the second one-dimensional transform type and the one-dimensional transform type for rows of each of the plurality of transform subblocks comprises the first one-dimensional transform type;

the one-dimensional transform type for columns of each of the upper-left subblock, any other upper row subblocks other than the upper-left subblock and any other left-hand column subblocks other than the upper-left subblock comprises the second one-dimensional transform type and the one-dimensional transform type for rows of each of the upper-left subblock, any other upper row subblocks and any left-hand column subblocks comprises the first one-dimensional transform type, and the one-dimensional transform type for columns of any subblocks of the plurality of subblocks other than the upper-left subblock, any other upper row subblocks and any other left-hand column subblocks comprises the second one-dimensional transform type and the one-dimensional transform type for rows of any subblocks of the plurality of subblocks other than the upper-left subblock, any other upper row subblocks and any other left-hand column subblocks comprises the second one-dimensional transform type; or the one-dimensional transform type for columns of each of the upper-left subblock and any other left-hand column subblocks other than the upper-left subblock comprises the second one-dimensional transform type and the one-dimensional transform type for rows of each of the upper-left subblock and any other left-hand column subblocks comprises the first one-dimensional transform type, and the one-dimensional transform type for columns of any subblocks of the plurality of subblocks other than the upper-left subblock and any other left-hand column subblocks comprises the second one-dimensional transform type and the one-dimensional transform type for rows of any subblocks of the plurality of subblocks other than the upper-left subblock and any other left-hand column subblocks comprises the second one-dimensional transform type.

5. The method of claim 1 wherein the intra prediction mode comprises a diagonal prediction mode and wherein one of:

the one-dimensional transform type for columns of each of the plurality of transform subblocks comprises the first one-dimensional transform type and the one-dimensional transform type for rows of each of the plurality of transform subblocks comprises the first one-dimensional transform type;

the one-dimensional transform type for columns of each of the upper-left subblock, any other upper row subblocks other than the upper-left subblock and any other left-hand column subblocks other than the upper-left subblock comprises the first one-dimensional transform type and the one-dimensional transform type for rows of each of the upper-left subblock, any other upper row subblocks and any left-hand column subblocks comprises the first one-dimensional transform type, and the one-dimensional transform type for columns of any subblocks of the plurality of subblocks other than the upper-left subblock, any other upper row subblocks and any other left-hand column subblocks comprises the second one-dimensional transform type and the one-dimensional transform type for rows of any subblocks of the plurality of subblocks other than the upper-left subblock, any other upper row subblocks and any other left-hand column subblocks comprises the second one-dimensional transform type; or the one-dimensional transform type for columns of each of the upper-left subblock and any other upper row subblocks comprises the first one-dimensional transform type and the one-dimensional transform type for rows of the upper-left subblock and any left-hand column subblocks comprises the first one-dimensional transform type, and the one-dimensional transform type for columns of any other left-hand column subblocks and any subblocks of the plurality of subblocks other than the upper-left subblock, any other upper row subblocks and any other left-hand column subblocks comprises the second one-dimensional transform type and the one-dimensional transform type for rows of any other upper row subblocks and any subblocks of the plurality of subblocks other than the upper-left subblock, any other upper row subblocks and any other left-hand column subblocks comprises the second one-dimensional transform type.

6. The method of claim 1, further comprising:
including at least one bit in the encoded video bitstream to represent the transform mode.

7. An apparatus, comprising:
a memory; and
a processor configured to execute instructions stored in the memory to:
identify an intra prediction mode of a current block of a frame in a video stream, the intra prediction mode being one of a plurality of intra prediction modes;
predict the current block to form a residual block using the intra prediction mode, the current block and the residual block having a prediction size;
identify a plurality of transform subblocks for the residual block, each of the plurality of transform subblocks having a transform size smaller than the prediction size;
identify a transform mode for the residual block from a plurality of transform modes based on the intra prediction mode of the current block, each transform mode of the plurality of transform modes associated with a different combination of a one-dimensional transform type for columns of the residual block and a one-dimensional transform type for rows of the residual block, wherein the one-dimensional transform type for columns of the prediction block comprises one of a first one-dimensional transform type having a base function that conforms with a pattern of a variance of pixel values resulting from the intra prediction mode or a second one-dimensional transform type having a base function that treats pixel values relatively uniformly, and the one-dimensional transform type for rows of the prediction block comprises one of the first one-dimensional transform type or the second one-dimensional transform type, and wherein the first one-dimensional transform type is a one-dimensional Asymmetrical Discrete Sine Transform and the second one-dimensional transform type is a one-dimensional Discrete Cosine Transform;

for each transform subblock of the plurality of transform subblocks, identify a one-dimensional subblock transform type for columns of the transform subblock and a one-dimensional subblock transform type for rows of the transform subblock based on the intra prediction mode of the current block, the transform mode for the residual block, and a position of the transform subblock within the residual block; and
transform each transform subblock of the plurality of transform subblocks to include in an encoded video bitstream using the one-dimensional subblock transform type identified for the columns of the transform subblock and the one-dimensional subblock transform type identified for the rows of the transform subblock.

8. The apparatus of claim 7 wherein the processor is configured to identify the transform mode by:
identifying a hybrid transform mode for a transform having a same size as the residual block based on the intra prediction mode, the hybrid transform mode having a first, vertical transform for the columns of the residual block and a second, horizontal transform for the rows of the residual block.

9. A method, comprising:
identifying an intra prediction mode of an encoded block in a video bitstream, the intra prediction mode being one of a plurality of intra prediction modes and the encoded block being an encoded residual block formed by predicting a current block of a frame of a video stream;
predicting the current block to form a prediction block using the intra prediction mode, the current block having a prediction size;
identifying a plurality of transform subblocks for the encoded residual block, each of the plurality of transform subblocks having a transform size smaller than the prediction size;
identifying, using a processor, a transform mode of the encoded residual block, the transform mode based on the intra prediction mode and the transform mode being one of a plurality of transform modes, each transform mode associated with a different combination of a one-dimensional transform type for columns and a one-dimensional transform type for rows of the encoded residual block, the one-dimensional transform type for columns of the residual block comprises one of a first one-dimensional transform type having a base function that conforms with a pattern of a variance of pixel values resulting from the intra prediction mode, wherein the first one-dimensional transform type is a one-dimensional Asymmetrical Discrete Sine Transform, or a second one-dimensional transform type having a base function that treats pixel values relatively uniformly, and the one-dimensional transform type for rows of the residual block comprises one of the first one-dimensional transform type or the second one-dimensional transform type;
inverse transforming each of the plurality of transform subblocks using the respective one-dimensional transform type for columns and the respective one-dimensional transform type for rows to form respective residual subblocks and joining the respective residual subblocks to form a residual block, the respective one-dimensional transform type for columns and the respective one-dimensional transform type for rows for each transform subblock based on the intra prediction mode of the current block, the one-dimensional transform type for columns and the one-dimensional transform type for rows of the encoded residual block, and a position of the transform subblock within the encoded residual block; and reconstructing the current block by adding the residual block and the prediction block.

* * * * *